US012307538B2

(12) United States Patent
Yang et al.

(10) Patent No.: US 12,307,538 B2
(45) Date of Patent: May 20, 2025

(54) TRAFFIC ACCIDENT HANDLING METHOD AND DEVICE, AND STORAGE MEDIUM

(71) Applicant: Beijing Jingdong Zhenshi Information Technology Co., Ltd., Beijing (CN)

(72) Inventors: Wenfeng Yang, Beijing (CN); Wenming Zhe, Beijing (CN); Jianqiang Yu, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 285 days.

(21) Appl. No.: 17/919,113

(22) PCT Filed: Mar. 23, 2021

(86) PCT No.: PCT/CN2021/082463
§ 371 (c)(1),
(2) Date: Oct. 14, 2022

(87) PCT Pub. No.: WO2021/208681
PCT Pub. Date: Oct. 21, 2021

(65) Prior Publication Data
US 2023/0162309 A1 May 25, 2023

(30) Foreign Application Priority Data
Apr. 15, 2020 (CN) .......................... 202010296915.7

(51) Int. Cl.
*G06Q 10/00* (2023.01)
*G06Q 50/26* (2012.01)
(52) U.S. Cl.
CPC .................. *G06Q 50/265* (2013.01)
(58) Field of Classification Search
CPC .... G06Q 50/265; G06Q 20/389; G06Q 50/26; G06Q 50/40; G06Q 10/10; G06Q 20/02;
(Continued)

(56) References Cited

U.S. PATENT DOCUMENTS 11,416,942 B1 * 8/2022 Leise ................... G07C 5/0816
2008/0161996 A1 7/2008 Chang
(Continued)

FOREIGN PATENT DOCUMENTS

CN 108446992 A 8/2018
CN 108846491 A 11/2018
(Continued)

OTHER PUBLICATIONS

Russ Banham. ("In Blockchain They Trust". CFO.com Jun. 26, 2019 ) (Year: 2019).*
(Continued)

*Primary Examiner* — Gabrielle A McCormick
(74) *Attorney, Agent, or Firm* — Finch & Maloney PLLC

(57) ABSTRACT

Provided in the embodiments of the present invention are a traffic accident handling method and device, and a storage medium. The traffic accident handling method includes: acquiring first accident data when a first vehicle has a traffic accident, wherein a first traffic accident handling device has an associative relationship with the first vehicle; on the basis of the first accident data, performing accident penalty determination processing to obtain a first penalty determination result; receiving a second penalty determination result sent by a second traffic accident handling device, wherein the second traffic accident handling device has an associative relationship with a second vehicle in the traffic accident other than the first vehicle, the second traffic accident handling device corresponds to a second node in a blockchain network and runs a smart contract, and the second penalty determination result is obtained by the second traffic accident handling device performing accident penalty determination processing on the traffic accident by means of the smart contract; and on the basis of the first penalty deter-
(Continued)

mination result and the second penalty determination result, determining a first target penalty determination result.

17 Claims, 7 Drawing Sheets

(58) Field of Classification Search
CPC .............. G06Q 20/065; G06Q 20/223; G06Q 20/3678; G06Q 20/3827; G06Q 20/3829; G06Q 20/401; G06Q 20/4016; G06Q 40/00; G06Q 2220/00; G06Q 50/18; G06Q 20/367; H04L 2209/84; H04L 63/0861; H04L 67/141; H04L 67/568; H04L 9/3231; H04L 9/50; H04L 63/0823; H04L 63/0876; H04L 67/12; H04L 51/046; H04L 2463/102; H04W 4/40; H04W 84/005; H04W 12/069; H04W 12/50; H04W 12/63; H04W 12/71; H04W 84/12; G06F 21/64
See application file for complete search history.

(56) References Cited

U.S. PATENT DOCUMENTS

| | | | | |
|---|---|---|---|---|
| 2019/0370760 | A1* | 12/2019 | Kundu | H04L 9/3239 |
| 2020/0312046 | A1* | 10/2020 | Righi | G07C 5/008 |
| 2020/0404612 | A1* | 12/2020 | Murphy | H04W 4/023 |

FOREIGN PATENT DOCUMENTS

| | | |
|---|---|---|
| CN | 108986468 A | 12/2018 |
| CN | 109741226 A | 5/2019 |
| CN | 110427432 A | 11/2019 |
| CN | 110572354 A | 12/2019 |
| CN | 110601847 A | 12/2019 |
| CN | 110610442 A | 12/2019 |
| CN | 110689460 A | 1/2020 |
| CN | 110738842 A | 1/2020 |
| CN | 111600839 A | 8/2020 |
| JP | 2005032027 A | 2/2005 |
| JP | 2010128980 A | 6/2010 |
| JP | 2019040588 A | 3/2019 |
| JP | 2020038673 A | 3/2020 |
| JP | 2020516968 A | 6/2020 |
| KR | 10-2011-0135072 A | 12/2011 |
| KR | 20200023159 A | 3/2020 |
| WO | 2019191094 A1 | 10/2019 |
| WO | 2020002520 A1 | 1/2020 |

OTHER PUBLICATIONS

King's College London (KCL): "Smart Contracts in Telco Permissioned Distributed Ledgers—System Architecture and Functional Specification Release", ETSI Draft; PDL(20)000038, European Telecommunications Standards Institute (ETSI), 650, Route Des Lucioles;F-06921 Sophia-Antipolis;France vol. ISG PDL Permissioned Distributed Ledger, ETSI GR PDL-v0.0.4 (Feb. 2020), Mar. 5, 2020 (Mar. 5, 2020), pp. 1-17, XP014365855, 17 pages.
Various: "Ethereum—Wikipedia", Oct. 15, 2018 (Oct. 15, 2018), XP055758812, the whole document, 18 pages.
Miyake S et al: "Energy-Efficient Mobile P2P Communications Based on Context Awareness", 2013 IEEE 27th International Conference on Advanced Information Networking and Applications, Mar. 25, 2013 (Mar. 25, 2013), pp. 918-923, XP032678485, ISSN: 1550-445X, DOI: 10.1109/AINA.2013.92 [retrieved on Jun. 13, 2013]. 6 pages.
Supplementary European Search Report in the European application No. 21789401.3, mailed on Apr. 18, 2023. 11 pages.
International Search Report in the international application No. PCT/CN2021/082463, mailed on Jun. 21, 2021.
English translation of the Written Opinion of the International Search Authority in the international application No. PCT/CN2021/082463, mailed on Jun. 21, 2021.

* cited by examiner

US 12,307,538 B2

TRAFFIC ACCIDENT HANDLING METHOD AND DEVICE, AND STORAGE MEDIUM

CROSS-REFERENCE TO RELATED APPLICATIONS

The present application is a national stage application of International Application No. PCT/CN2021/082463 filed on Mar. 23, 2021, which is based on and claims priority of Chinese Application No. 202010296915.7, filed on Apr. 15, 2020. The contents of the above applications are hereby incorporated by reference in their entireties

TECHNICAL FIELD

The present disclosure relates to the technical field of blockchain, and relates to but is not limited to a method and device for traffic accident handling and a storage medium.

BACKGROUND

At present, when encountering a vehicle driving accident, the drivers of the involved parties usually get off the vehicles to take photos for evidence, and negotiate with each other to solve the accident. If no agreement can be reached, the traffic police will be called to enforce the penalty. For the process of waiting for the traffic police, there is a problem of long waiting time, thereby resulting in traffic congestion. Moreover, with the continuous development of unmanned automatic driving technology, unmanned driving of vehicles will gradually become popular in the future.

Therefore, when traffic accidents occur in the process of manned driving and unmanned driving, how to deal with traffic accidents reliably, quickly and effectively has become a problem to be urgently solved.

SUMMARY

For this reason, embodiment of the present disclosure expects to provide a method and device for traffic accident handling and a storage medium.

The technical scheme of the embodiments of the present disclosure is realized as follows.

Embodiments of the present disclosure provide a method for traffic accident handling. The method is applied to a smart contract running on a first traffic accident handling device corresponding to a first node in a blockchain network, which includes the following operations.

First accident data of a first vehicle in a traffic accident is obtained. Herein the first traffic accident handling device has an association relationship with the first vehicle.

Accident penalty handling is performed based on the first accident data to obtain a first penalty result.

A second penalty result is received from a second traffic accident handling device. Herein the second traffic accident handling device has an association relationship with a second vehicle other than the first vehicle in the traffic accident. The second traffic accident handling device corresponds to a second node in the blockchain network and is configured to run the smart contract. The second penalty result is obtained by the second traffic accident handling device performing the accident penalty handling on the traffic accident through the smart contract.

A first target penalty result is determined based on the first penalty result and the second penalty result.

Embodiments of the present disclosure provide a first traffic accident handling device. The first traffic accident handling device corresponds to a first node in a blockchain and includes a processor, a memory and a communication bus.

The communication bus is configured to realize communication connection between the processor and the memory.

The processor is configured to run a smart contract stored in the memory and execute a traffic accident handling program stored in the memory through the smart contract so as to implement the following operations.

First accident data of a first vehicle in a traffic accident is obtained. Herein the first traffic accident handling device has an association relationship with the first vehicle.

Accident penalty handling is performed based on the first accident data to obtain a first penalty result.

A second penalty result is received from a second traffic accident handling device. Herein the second traffic accident handling device has an association relationship with a second vehicle other than the first vehicle in the traffic accident. The second traffic accident handling device corresponds to a second node in the blockchain and is configured to run the smart contract. The second penalty result is obtained by the second traffic accident handling device performing the accident penalty handling on the traffic accident through the smart contract.

A first target penalty result is determined based on the first penalty result and the second penalty result.

Embodiments of the present disclosure provide a storage medium. The storage medium has executable instructions stored thereon. Herein the executable instructions, when executed, cause a processor to implement the any one of the above mentioned methods for traffic accident handling.

DETAILED DESCRIPTION

In order to make the objectives, technical solutions and advantages of the present disclosure clearer, the present disclosure will be described in further detail below with reference to the drawings. The described embodiments should not be regarded as limiting the present disclosure. All other embodiments obtained by those skilled in the art without making creative labor should belong to the scope of protection of the present disclosure.

Unless otherwise defined, all technical and scientific terms used herein have the same meanings as those commonly understood by those skilled in the art to which the present disclosure belongs. The terms used herein are only for the purpose of describing the embodiments of the present disclosure and are not intended to limit the present disclosure.

Before describing the embodiments of the present disclosure in further detail, the nouns and terms involved in the embodiments of the present disclosure will be described. The nouns and terms involved in the embodiments of the present disclosure are applicable to the following explanations.

1) Blockchain Wallet: the blockchain wallet is a system that stores a public key and a private key of cryptocurrencies led by bitcoin, an address corresponding to the private key, and supports currency settlement of the address (address group), and currency transactions. The system sometimes even includes the accounting and maintenance of the whole blockchain. Since the cryptocurrencies are mainly based on the blockchain, an actual amount is subject to a final record result of the blockchain. Since introduction of the ERC-721 protocol by Ethereum, the blockchain wallet can store not only currency but also virtual items.

2) Wallet address: each blockchain wallet corresponds to an address to uniquely indicate the wallet ID.

3) Smart contract: the smart contract is a computer protocol intended to disseminate, verify or execute contracts in an information-based manner. The smart contract allows trusted transactions without a third party, and the transactions are traceable and irreversible.

Figure 1:
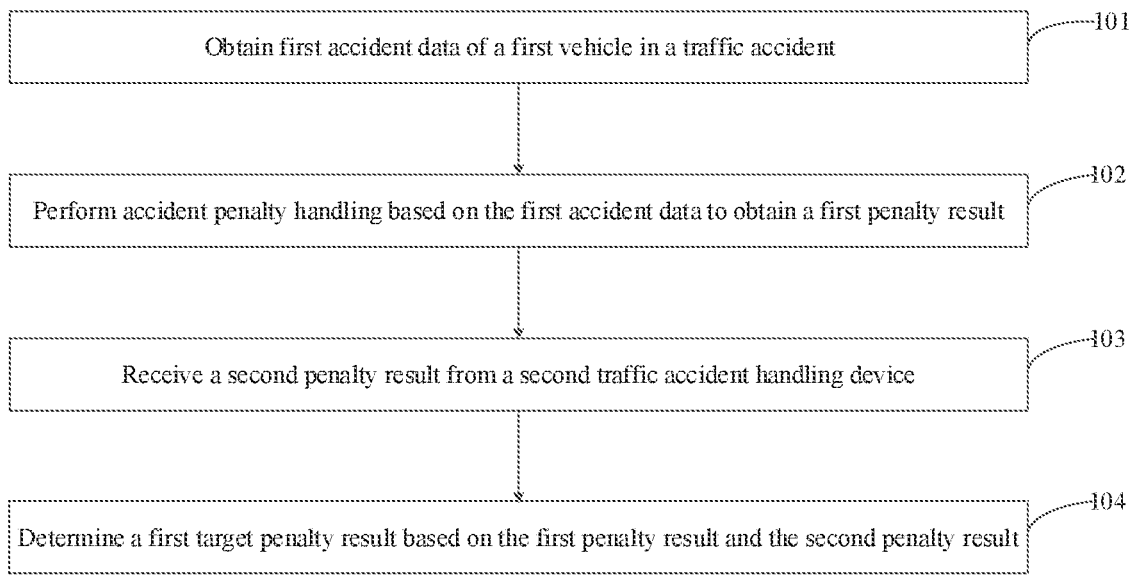
FIG. 1 is a flowchart of a method for traffic accident handling according to an embodiment of the present disclosure.

Embodiments of the present disclosure provide a method for traffic accident handling. The method is applied to a smart contract running in a first traffic accident handling device corresponding to a first node in a blockchain network. As illustrated in FIG. 1, the method includes the following operations.

At block 101, first accident data of a first vehicle in a traffic accident is obtained.

Herein the first traffic accident handling device has an association relationship with the first vehicle.

In the embodiments of the present disclosure, the first traffic accident handling device may be a central control device of the vehicle (e.g. vehicle-mounted computer of the vehicle), or other vehicle-mounted devices independent of the central control device of the vehicle (e.g. embedded device installed in the vehicle), or even a smart phone or a tablet computer, etc. Unless otherwise specified, the first traffic accident handling device usually acts as a node in the blockchain network. Furthermore, the first traffic accident handling device is configured to run a smart contract issued by a legal institution, such as a smart contract issued by the traffic management department for traffic accident handling. Accordingly, all embodiments of the present disclosure are realized in the smart contract running in the first traffic accident handling device and the smart contract running in the second traffic accident handling device. In some application scenarios, the smart contract may also be replaced by a platform with a smart penalty model to realize the technical schemes of the present disclosure. In other words, the first traffic accident handling device communicates with the platform.

The first vehicle may be a vehicle that currently requires operation and control of a user, or may be a driverless vehicle, or may be a vehicle that may be operated and controlled by a user and may also be driverless. The first vehicle may be a motorized vehicle or a non-motorized vehicle. The association relationship between the first traffic accident handling device and the first vehicle is that the first traffic accident handling device is mounted on the first vehicle.

The first accident data may be obtained through the acquisition at the site of traffic accident by at least one acquisition device having communication connection with the first traffic accident handling device when the traffic accident occurs on the first vehicle. The at least one acquisition device may send the obtained first accident data to the first traffic accident handling device. The first accident data may include information such as sound, picture, text, audio, video, and the like when the first vehicle has a traffic accident.

At block 102, accident penalty handling is performed based on the first accident data to obtain a first penalty result.

In the embodiments of the present disclosure, the smart contract in the first traffic accident handling device performs the accident penalty handling on the first accident data to obtain the first penalty result. The first penalty result may include at least a judgment result of accident liability. Furthermore, the first penalty result may include at least one of an accident type, an amount of accident indemnity and accident penalty, etc.

At block 103, a second penalty result is received from a second traffic accident handling device.

Herein the second traffic accident handling device has an association relationship with a second vehicle other than the first vehicle in the traffic accident. The second traffic accident handling device corresponds to a second node in the blockchain network and is configured to run the smart contract. The second penalty result is obtained by the second traffic accident handling device performing the accident penalty handling on the traffic accident through the smart contract.

In the embodiments of the present disclosure, the operation mode and operation content of the second traffic accident handling device are the same as those of the first traffic accident handling device. In other words, the second traffic accident handling device and the first traffic accident handling device are two different nodes in the same blockchain network, and the second traffic accident handling device and the first traffic accident handling device run the same smart contract. In this way, the first traffic accident handling device and the second traffic accident handling device use the same smart contract to perform the penalty handling on the traffic accident, thereby ensuring the consistency of penalty principles, improving the reliability of penalty results and further ensuring the credibility of penalty results.

The difference between the first traffic accident handling device and the second traffic accident handling device is that the first traffic accident handling device is mounted on the first vehicle, but the second traffic accident handling device is mounted on the second vehicle, which is another vehicle having the traffic accident with the first vehicle. The second traffic accident handling device and the first traffic accident handling device may have the same device form or different device forms. For example, both the second traffic accident handling device and the first traffic accident handling device may be central control devices of the vehicles. Alternatively, the first traffic accident handling device may be a smart phone, and the second traffic accident handling device is an embedded device installed on the second vehicle.

The smart contract running in the second traffic accident handling device performs the accident penalty handling based on the obtained second accident data of the second vehicle to obtain the second penalty result. The second traffic accident handling device is mounted on the second vehicle having the traffic accident with the first vehicle. Similarly, the second penalty result may include at least the judgment result of accident liability. Furthermore, the second penalty result may include at least one of the accident type, the amount of accident indemnity and the accident penalty, etc.

At block 104, a first target penalty result is determined based on the first penalty result and the second penalty result.

In the embodiments of the present disclosure, the first traffic accident handling device compares and analyzes the first penalty result and the second penalty result to determine the first target penalty result. For example, if the first penalty result is that the first vehicle is not responsible and the second penalty result is that the second vehicle is responsible, it can be determined that the first penalty result is the same as the second penalty result and the first target penalty result is that the first vehicle is not responsible and the second vehicle is responsible.

Similarly, the first traffic accident handling device sends the first penalty result to the second traffic accident handling device after obtaining the first penalty result. The second traffic accident handling device performs comparison and analysis based on the first penalty result and the second penalty result to determine the second target penalty result.

In this way, the first traffic accident handling device and the second traffic accident handling device perform the penalty handling on the traffic accident through the smart contract respectively, realize the point-to-point interaction of the penalty results, and determine the target penalty results respectively, thereby improving the communication efficiency between the nodes. Moreover, there is no need to wait for the traffic police to come to the accident site to handle the traffic accident, which improve the efficiency of the traffic accident handling.

According to the method for traffic accident handling provide in the embodiments of the present disclosure, the first accident data of the first vehicle in the traffic accident is obtained. The accident penalty handling is performed based on the first accident data to obtain the first penalty result. The second penalty result is received from the second traffic accident handling device. The first target penalty result is determined based on the first penalty result and the second penalty result. In this way, the involved parties in the traffic accident all run the same smart contract, which can ensure the consistency of the accident penalty handling. Furthermore, the involved parties, which are nodes in the blockchain network, can directly realize the point-to-point communication to perform interaction on the corresponding penalty results, thereby simplifying the communication process between the nodes in the blockchain network, solving the problem that efficiency of traffic accident handling is low due to the tedious and the time-consuming process of the traffic accident handling when traffic accidents occur, ensuring the credibility of accident penalty handling based on the blockchain and effectively improving the efficiency of traffic accident handling.

Figure 2:
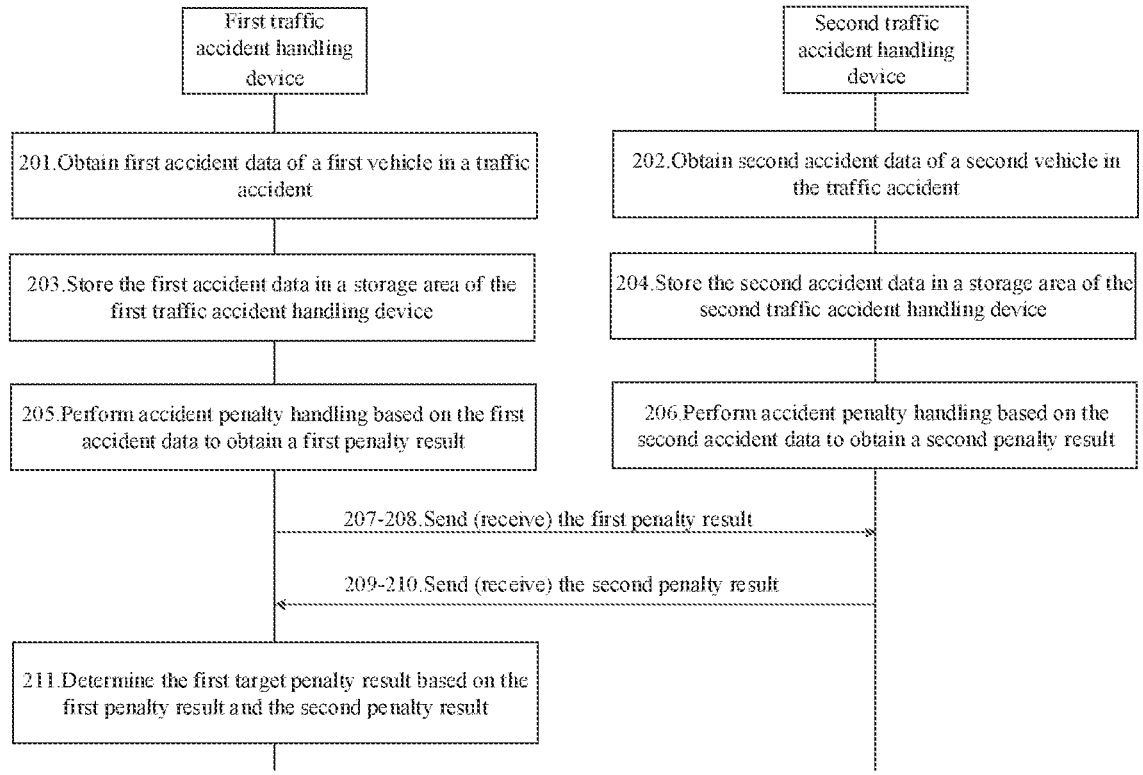
FIG. 2 is another flowchart of a method for traffic accident handling according to an embodiment of the present disclosure.

Based on the above mentioned embodiments, embodiments of the present disclosure provide a method for traffic accident handling. As illustrated in FIG. 2, the method includes the following operations.

At block 201, a first traffic accident handling device obtains first accident data of a first vehicle in a traffic accident.

Herein the first traffic accident handling device has an association relationship with the first vehicle. The first traffic accident handling device corresponds to a first node in a blockchain network.

At block 202, the second traffic accident handling device obtains second accident data of a second vehicle in the traffic accident.

The second traffic accident handling device has an association relationship with a second vehicle other than the first vehicle in the traffic accident. The second traffic accident handling device corresponds to a second node in the blockchain network and is configured to run a smart contract.

In the embodiments of the present disclosure, when the traffic accident occurs between the first vehicle and the second vehicle, an acquisition device installed on the first vehicle collects the accident data at the site of the traffic accident to obtain the first accident data corresponding to the first vehicle, and an acquisition device installed on the second vehicle collects the accident data at the site of the traffic accident to obtain the second accident data corresponding to the second vehicle. The acquisition device installed on the first vehicle sends the collected first accident data to the first traffic accident handling device, and the acquisition device installed on the second vehicle sends the collected second accident data to the second traffic accident handling device. The first accident data may include sound information of vehicle collision when the traffic accident occurs, image information of a collision position where the first vehicle collides with the second vehicle or video information including a process of the collision, distance information between the first vehicle and the second vehicle when the collision occurs, information of a position where the accident between the first vehicle and the second vehicle occurs, and the like. It should be noted that the above information can be determined according to the acquisition device installed on the first vehicle, and the first accident data includes at least one of the above information. The second accident data may also include at least one of the above information as described for the first accident data and will not be described in detail here. The operations of the block 201 and the block 202 can be executed simultaneously.

At block 203, the first traffic accident handling device stores the first accident data in a storage area of the first traffic accident handling device.

In the embodiments of the present disclosure, the first traffic accident handling device serves as a blockchain node and may synchronously upload the first accident data stored in the storage area of the first traffic accident handling device to a blockchain maintained by the blockchain network through the smart contract. The first accident data may be synchronized by the first traffic accident handling device to the blockchain in real time or at a specific time.

At block 204, the second traffic accident handling device stores the second accident data in a storage area of the second traffic accident handling device.

In the embodiments of the present disclosure, the second traffic accident handling device also serves as a blockchain node and may synchronously upload the second accident data stored in the storage area of the second traffic accident handling device to the blockchain maintained by the blockchain network through the smart contract. The second accident data may be synchronized by the second traffic accident handling device to the blockchain in real time or at a specific time. In this way, traffic accident data may be stored based on unchangeable characteristic of the blockchain. The operations of the block 203 and 204 may be executed simultaneously.

At block 205, the first traffic accident handling device performs accident penalty handling based on the first accident data to obtain a first penalty result.

In the embodiments of the present disclosure, the first traffic accident handling device implements accident penalty handling by performing accident analysis on the first accident data according to the running smart contract to obtain the first penalty result.

At block 206, the second traffic accident handling device performs accident penalty handling based on the second accident data to obtain a second penalty result.

In the embodiments of the present disclosure, the second traffic accident handling device implements accident penalty handling by performing accident analysis on the second accident data according to the running smart contract to obtain the second penalty result. The operations of the block 205 and the block 206 may be executed simultaneously.

At block 207, the first traffic accident handling device sends the first penalty result to the second traffic accident handling device.

In the embodiments of the present disclosure, the interaction of the penalty results between the first traffic accident handling device and the second traffic accident handling device may be realized by a preset communication network or a wireless short-range communication mode. The preset communication network may be one of a second generation mobile communication network, a third generation mobile communication network, a fourth generation mobile communication network, a fifth generation mobile communication network, a wireless local area network communication network, and the like. The wireless short-range communication mode may be one of a Bluetooth communication, a ZigBee communication, an infrared communication, and the like.

At block 208, the second traffic accident handling device receives the first penalty result from the first traffic accident handling device.

At block 209, the second traffic accident handling device sends the second penalty result to the first traffic accident handling device.

Herein the second traffic accident handling device has an association relationship with a second vehicle other than the first vehicle in the traffic accident. The second traffic accident handling device corresponds to a second node in the blockchain network and is configured to run the smart contract. The second penalty result is obtained by the second traffic accident handling device performing the accident penalty handling on the traffic accident through the smart contract.

The operations of the block 207 and the block 209 may be executed simultaneously.

At block 210, the first traffic accident handling device receives the second penalty result from the second traffic accident handling device.

At block 211, the first traffic accident handling device determines the first target penalty result based on the first penalty result and the second penalty result.

In the embodiments of the present disclosure, the first traffic accident handling device analyzes the first penalty result and the second penalty result to determine the first target penalty result.

In the embodiments of the present disclosure, the operation that the first traffic accident handling device determines the first target penalty result based on the first penalty result and the second penalty result in the block 211 may be realized by operation a11 or by operations a12 to a14. In a case that the first penalty result is the same as the second penalty result, the operation a11 is performed. In a case that the first penalty result is different from the second penalty result, the operations a12 to a14 are performed.

In the operation a11, in the case that the first penalty result is the same as the second penalty result, the first traffic accident handling device determines the first penalty result and the second penalty result as the first target penalty result.

In the embodiments of the present disclosure, if the first penalty result is that the first vehicle is responsible and the second penalty result is that the second vehicle is not responsible, it can be determined that the first penalty result is the same as the second penalty result. Accordingly, the first target penalty result is that the first vehicle is responsible and the second vehicle is not responsible. Alternatively, if the first penalty result is that the first vehicle is not responsible and the second penalty result is that the second vehicle is responsible, it can be determined that the first penalty result is the same as the second penalty result. Accordingly, the first target penalty result is that the first vehicle is not responsible and the second vehicle is responsible.

In the operation a12, in the case that the first penalty result is different from the second penalty result, the first traffic accident handling device sends an adjudication request to a penalty device.

Herein the adjudication request is configured to request the penalty device to perform the accident penalty handling based on the first accident data in the blockchain to obtain the first target penalty result.

In the embodiments of the present disclosure, the penalty device may be a third-party smart penalty device. In other words, the penalty device may be a device that runs a model for performing penalty on traffic accidents automatically. Alternatively, the penalty device may be a device that may be operated and controlled by a user performing third-party judgment, such as a traffic police. An Internet communication network (including the mobile communication network) may be used for the communication between the first traffic accident handling device and the penalty device.

If the first penalty result is that the first vehicle is responsible and the second penalty result is that the second vehicle is responsible, it can be determined that the first penalty result is different from the second penalty result. Alternatively, if the first penalty result is that the first vehicle is not responsible and the second penalty result is that the second vehicle is not responsible, it can be determined that the first penalty result is different from the second penalty result.

In the operation a13, the penalty device responds to the adjudication request from the first traffic accident handling device, obtains target accident data corresponding to the adjudication request from the blockchain, performs the accident penalty handling on the target accident data to obtain the first target penalty result, and sends the first target penalty result to the first traffic accident handling device.

In the embodiments of the present disclosure, the target accident data may be the first accident data corresponding to the first traffic accident handling device, the second accident data corresponding to the second traffic accident handling device, or the first accident data corresponding to the first traffic accident handling device as well as the second accident data corresponding to the second traffic accident handling device. In an example, after receiving the adjudication request from the first traffic accident handling device, the penalty device may perform the accident penalty handling only according to the first accident data uploaded to the blockchain by the first traffic accident handling device, so as to obtain the first target penalty result. Alternatively, the penalty device may perform the accident penalty handling according to the first accident data uploaded to the blockchain by the first traffic accident handling device and the second accident data uploaded to the blockchain by the second traffic accident handling device, so as to obtain the first target penalty result.

In an example, if the penalty device is a device that can be operated and controlled by a user performing third-party judgment (e.g. the traffic police), such as a computer device or a smart mobile device that may be connected to the Internet, after the penalty device receives the adjudication request, the penalty device obtains the first accident data corresponding to the first vehicle from the blockchain and displays the first accident data, so that the user performing the third-party judgment can perform the accident penalty handling on the first accident data and input the accident penalty result to the penalty device, thereby obtaining the first target penalty result and enabling the penalty device to send the first target penalty result to the first traffic accident handling device.

Alternatively, after receiving the adjudication request, in order to ensure a more fair judgment, the penalty device obtains the first accident data corresponding to the first vehicle and the second accident data corresponding to the second vehicle which has the traffic accident with the first vehicle from the blockchain, and displays the first accident data and the second accident data. After making the penalty result according to the viewed first accident data and second accident data, the user performing the third-party judgment inputs the penalty result to the penalty device, so that the first target penalty result can be obtained and sent to the first traffic accident handling device through the penalty device.

In the operation a14, the first traffic accident handling device receives the first target penalty result from the penalty device.

Figure 3:
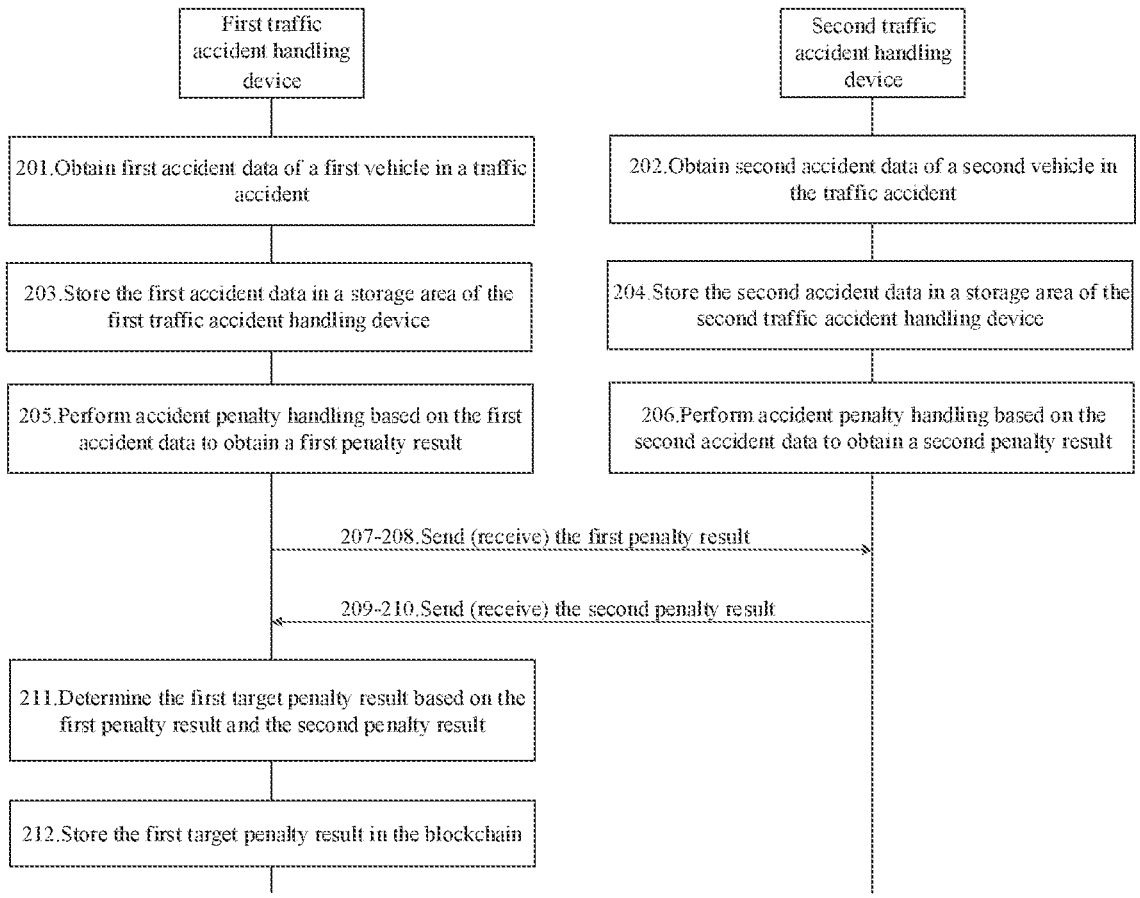
FIG. 3 is yet another flowchart of a method for traffic accident handling according to an embodiment of the present disclosure.

Based on the embodiments illustrated in FIG. 2, after the operation of the block 211 is performed, the first traffic accident handling device may also perform operation of block 212, which is illustrated in FIG. 3.

At block 212, the first traffic accident handling device stores the first target penalty result in the blockchain.

In the embodiments of the present disclosure, each of the first traffic accident handling device and the second traffic accident handling device stores the respective corresponding penalty result in the blockchain, thereby realizing effective storage of the respective corresponding penalty results.

It should be noted that the same operations and contents in the embodiments as in other embodiments may be described with reference to other embodiments and will not be repeated here.

According to the method for traffic accident handling provide in the embodiments of the present disclosure, the first accident data of the first vehicle in the traffic accident is obtained. The accident penalty handling is performed based on the first accident data to obtain the first penalty result. The second penalty result is received from the second traffic accident handling device. The first target penalty result is determined based on the first penalty result and the second penalty result. In this way, the involved parties in the traffic accident all run the same smart contract, which can ensure the consistency of the accident penalty handling. Furthermore, the involved parties, which are nodes in the blockchain network, can directly realize the point-to-point communication to perform interaction on the corresponding penalty results, thereby simplifying the communication process between the nodes in the blockchain network, solving the problem that efficiency of traffic accident handling is low due to the tedious and the time-consuming process of the traffic accident handling when traffic accidents occur, ensuring the credibility of accident penalty handling based on the blockchain and effectively improving the efficiency of traffic accident handling.

Figure 4:
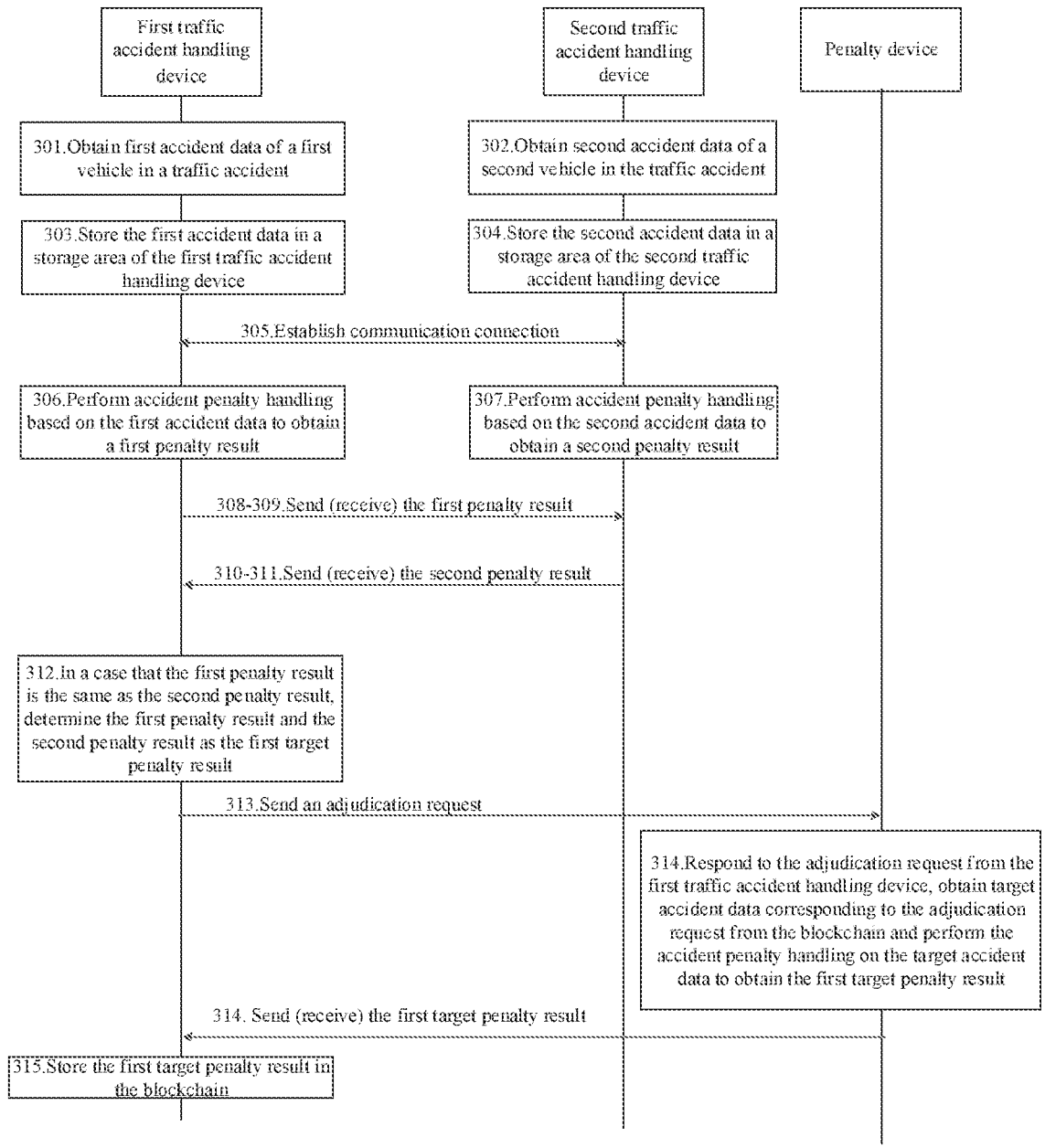
FIG. 4 is still another flowchart of a method for traffic accident handling according to an embodiment of the present disclosure.

Based on the above mentioned embodiments, embodiments of the present disclosure provide a method for traffic accident handling. As illustrated in FIG. 4, the method includes the following operations.

At block 301, a first traffic accident handling device obtains first accident data of a first vehicle in a traffic accident.

At block 302, a second traffic accident handling device obtains second accident data of a second vehicle in the traffic accident.

Herein the first traffic accident handling device has an association relationship with the first vehicle. The first traffic accident handling device corresponds to a first node in a blockchain network. The second traffic accident handling device has an association relationship with a second vehicle other than the first vehicle in the traffic accident. The second traffic accident handling device corresponds to a second node in the blockchain network and is configured to run a smart contract.

In the embodiments of the present disclosure, an example that there is a rear-end accident between the first vehicle and the second vehicle, the first traffic accident handling device is a first central control of the first vehicle and the second traffic accident handling device is a second central control of the second vehicle is taken for description. It is assumed that the first vehicle is a front vehicle and the second vehicle is a rear vehicle. In other words, the first vehicle is a rear-ended vehicle and the second vehicle is a rear-ending vehicle. In an example, the first accident data includes a distance between the first vehicle and the second vehicle when the rear-end accident occurs, position information of the first vehicle, sound of collision when the rear-end accident occurs (including time when the sound of the collision is generated), acceleration of the first vehicle, operation data of brake corresponding to the brake of the first vehicle, and the like. The second accident data includes the distance between the first vehicle and the second vehicle when the rear-end accident occurs, position information of the second vehicle, the sound of the collision when the rear-end accident occurs (including the time when the sound of the collision is generated), acceleration of the second vehicle, operation data of the brake corresponding to the brake of the second vehicle, and the like.

At block 303, the first traffic accident handling device stores the first accident data in a storage area of the first traffic accident handling device.

At block 304, the second traffic accident handling device stores the second accident data in a storage area of the second traffic accident handling device.

Herein blockchain is maintained by the blockchain network.

In the embodiments of the present disclosure, in some application scenarios, the first traffic accident handling device and the second traffic accident handling device may jointly maintain the same blockchain. In other words, the operations corresponding to the first traffic accident handling device and the second traffic accident handling device (e.g.

operations of storing the accident data and/or the final target penalty result) are recorded in the same blockchain.

In some other application scenarios, the first traffic accident handling device may correspond to a blockchain, and the second traffic accident handling device may correspond to another blockchain. The blockchain corresponding to the first traffic accident handling device is different from the blockchain corresponding to the second traffic accident handling device. In other words, the operations corresponding to the first traffic accident handling device (e.g. the operations of storing the first accident data and/or the final first target penalty result) are recorded in the blockchain corresponding to the first traffic accident handling device, and the operations corresponding to the second traffic accident handling device (e.g. the operation of storing the second accident data and/or the final second target penalty result) are recorded in the blockchain corresponding to the second traffic accident handling device. The blockchain corresponding to the first traffic accident handling device and the blockchain corresponding to the second traffic accident handling device are in the same blockchain network. The operations of the block 303 and the block 304 may be executed simultaneously.

In an example, the first traffic accident handling device and the second traffic accident handling device jointly maintain the same blockchain. After obtaining the first accident data, the first traffic accident handling device synchronously uploads the first accident data to the blockchain through the smart contract running in the first traffic accident handling device. Similarly, after obtaining the second accident data, the second traffic accident handling device synchronously uploads the second accident data to the blockchain through the smart contract running in the second traffic accident handling device.

At block 305, communication connection between the first traffic accident handling device and the second traffic accident handling device is established.

Herein communication mode includes an instant chat tool mode for communication based on a preset communication network, or a wireless short-range instant communication mode.

In other embodiments of the present disclosure, the block 305 may be realized by operations b11 to b13.

In the operation b11, the first traffic accident handling device obtains vehicle identification information of the second vehicle.

In the embodiments of the present disclosure, the vehicle identification information of the second vehicle may be license plate number of the second vehicle. The license plate number of the second vehicle may be collected by an acquisition device having communication connection with the first traffic accident handling device and sent to the first traffic accident handling device. For example, the first traffic accident handling device may collect image or video including the license plate number of the second vehicle through vehicle-mounted camera of the first vehicle, and identify the license plate number of the second vehicle in the collected image or video through Optical Character Recognition (OCR). Alternatively, a driver or passenger in the first vehicle manually inputs the license plate number of the second vehicle to the first traffic accident handling device.

In the operation b12, the first traffic accident handling device determines the communication mode corresponding to the vehicle identification information of the second vehicle.

In the embodiments of the present disclosure, the first traffic accident handling device may obtain the communication mode corresponding to the vehicle identification information of the second vehicle from the blockchain based on the vehicle identification information of the second vehicle.

In the operation b13, the first traffic accident handling device establishes the communication connection with the second traffic accident handling device based on the communication mode.

In an example, when the determined communication mode is the instant chat tool mode for communication based on a preset communication network, each license plate number may be set to be bound with a respective account identification number of an instant chat tool. In this way, the first vehicle may directly establish the communication connection with the second vehicle according to the account identification number of instant chat tool through a mobile communication network, such as a second generation mobile communication network, a third generation mobile communication network, a fourth generation mobile communication network, a fifth generation mobile communication network, and the like, so that the network communication can be realized. Alternatively, when the determined communication mode is the wireless short-range instant communication mode, an example that the wireless short-range instant communication mode is Bluetooth communication is taken for description. Each license plate number may be bound with Bluetooth identification information of a Bluetooth communication device arranged in a respective vehicle. After identifying the license plate number of the second vehicle, the first vehicle requests to establish a communication connection with a Bluetooth communication device of the second traffic accident handling device installed in the second vehicle according to the Bluetooth identification information of the second vehicle, thereby realizing the communication connection.

In other embodiments of the present disclosure, when the communication mode is the wireless short-range instant communication mode, the operation b13 may be realized by the following operations. In a case that a target distance between the first vehicle and the second vehicle is within a preset distance range, the wireless short-range instant communication mode is enabled, and the communication connection with the second traffic accident handling device is established through the wireless short-range instant communication mode.

Herein the first accident data includes the target distance.

In an example, description is given by taking the wireless short-range instant communication mode being the Bluetooth communication mode as an example. At the moment when the first vehicle collides with the second vehicle, Global Positioning System (GPS) coordinates of the first vehicle and GPS coordinates of the second vehicle are collected through the vehicle-mounted GPS of the first vehicle. Bluetooth matching information is sent according to a preset collision GPS coordinate fence. Automatic connection is performed after Bluetooth of the first traffic accident handling device and Bluetooth of the second traffic accident handling device are matched successfully, thereby realizing the communication connection between the first traffic accident handling device and the second traffic accident handling device.

It should be noted that the operations b11 to b13 may also be implemented by the second traffic accident handling device and the specific implementation process is the same as the process of the operations implemented by the first traffic accident handling device. Therefore, when the operations b11 to b13 is implemented by the second traffic accident handling device, the specific implementation process may refer to the operations b11 to b13 implemented by the first traffic accident handling device and will not be described in detail here.

At block 306, the first traffic accident handling device performs accident penalty handling based on the first accident data to obtain a first penalty result.

At block 307, the second traffic accident handling device performs accident penalty handling based on the second accident data to obtain a second penalty result.

In an example, if a rear radar ranging sensor of the first vehicle detects that a distance between the first vehicle and a rear vehicle (i.e. the second vehicle) decreases to be within a preset collision threshold range, and an acceleration sensor having communication connection with the first traffic accident handling device suddenly detects that an acceleration increases within a first preset time (which indicates that the first vehicle accelerates suddenly), and both a headstock of the first vehicle and a tailstock of the first vehicle are within a lane, as captured by a front camera and a rear camera (the front camera and the rear camera are arranged in the first vehicle and have communication connection with the first traffic accident handling device), and a sound sensor that is arranged in the first vehicle and has communication connection with the first traffic accident handling device detects the first accident data with a "bang" collision sound, it can be preliminarily determined according to traffic rules that the first vehicle is rear-ended and the rear vehicle is fully responsible.

If a GPS positioning information of the second vehicle is acquired when a front radar ranging sensor of the second vehicle (i.e. the rear vehicle) detects that the distance between the second vehicle and a front vehicle (i.e. the second vehicle) decreases to be within the preset collision threshold range, and the a sound sensor that is arranged in the second vehicle and has communication connection with the second traffic accident handling device detects the "bang" collision sound, and an acceleration sensor that is arranged in the second vehicle and has communication connection with the second traffic accident handling device detects that an acceleration decreases within a second preset time (which indicates that the second vehicle decelerates suddenly), and a brake sensor that is arranged in the second vehicle and has communication connection with the second traffic accident handling device fails to detect the second accident data with a brake action of the second vehicle, it is determined by the second traffic accident handling device that the collision occurs in front of the second vehicle and the second vehicle rear-ends another vehicle. Herein the operations of the block 306 and the block 307 may be executed simultaneously.

In other embodiments of the present disclosure, the operation "the first traffic accident handling device performs accident penalty handling based on the first accident data to obtain a first penalty result" of the block 306 may be realized by operations c11 to c12.

In the operation c11, the first traffic accident handling device obtains the second accident data of the second vehicle.

In other embodiments of the present disclosure, the operation c11 may be realized by operation c111 or by operations c112 to c113.

In the operation c111, the first traffic accident handling device obtains the second accident data from the blockchain.

In the operation c112, the first traffic accident handling device sends a request to the second traffic accident handling device.

Herein the request is configured to request the second traffic accident handling device to send the second accident data to the first traffic accident handling device.

In the operation c113, the first traffic accident handling device receives the second accident data from the second traffic accident handling device.

In the operation C12, the first traffic accident handling device performs the accident penalty handling based on the first accident data and the second accident data to obtain the first penalty result.

It should be noted that the operations c11 to c12 may be performed according to actual situation, which includes the following application scenarios. In a case that the accident penalty handling cannot be realized when the first traffic accident handling device uses the first accident data for the accident penalty handling, the operations c11 to c12 may be performed. Alternatively, the operations c11 to c12 may be performed to get a more accurate first penalty result. Similarly, when the second traffic accident handling device performs the accident penalty handling base on the second accident data to obtain the second penalty result, the application scenarios of whether to obtain the first accident data corresponding to the first traffic accident handling device may also refer to the application scenarios of the operations c11 to c12. When it is necessary to obtain the first accident data corresponding to the first traffic accident handling device, the specific process of operations may refer to the process of the operations c11 to c12, and will not be detailed here.

At block 308, the first traffic accident handling device sends the first penalty result to the second traffic accident handling device.

At block 309, the second traffic accident handling device receives the first penalty result from the first traffic accident handling device.

At block 310, the second traffic accident handling device sends the second penalty result to the first traffic accident handling device.

Herein the operations of the block 308 and the block 310 may be executed simultaneously.

At block 311, the first traffic accident handling device receives the second penalty result from the second traffic accident handling device.

Herein the second traffic accident handling device has an association relationship with a second vehicle other than the first vehicle in the traffic accident. The second traffic accident handling device corresponds to a second node in the blockchain network and is configured to run the smart contract. The second penalty result is obtained by the second traffic accident handling device performing the accident penalty handling on the traffic accident through the smart contract.

It should be noted that after performing the operation of the block 311, the first traffic accident handling device may perform operation of block 312 or operations of blocks 313 and block 314. In a case that the first penalty result is the same as the second penalty result, the first traffic accident handling device or the second traffic accident handling device may perform the operation of the block 312. In a case that the first penalty result is different from the second penalty result, the operations of the block 313 and block 314 are performed.

At block 312, in the case that the first penalty result is the same as the second penalty result, the first traffic accident handling device determines the first penalty result and the second penalty result as the first target penalty result.

At block 313, in the case that the first penalty result is different from the second penalty result, the first traffic accident handling device sends an adjudication request to a penalty device.

Herein the adjudication request is configured to request the penalty device to perform the accident penalty handling based on the first accident data in the blockchain to obtain the first target penalty result.

At block 314, the penalty device responds to the adjudication request from the first traffic accident handling device, obtains target accident data corresponding to the adjudication request from the blockchain, performs the accident penalty handling on the target accident data to obtain the first target penalty result, and sends the first target penalty result to the first traffic accident handling device, so that the first traffic accident handling device may receive the first target penalty result from the penalty device.

In an example, when the penalty device in the block 312 or the block 314 is a third-party smart penalty device, the third-party smart penalty device may obtain accident data uploaded to the blockchain by different traffic accident handling devices in the same accident for the accident penalty handling. For example, the third-party smart penalty device may obtain the first accident data uploaded to the blockchain by the first traffic accident handling device and the second accident data uploaded to the blockchain by the second traffic accident handling device, perform the accident penalty handling and obtain the first target penalty result. At this time, when the penalty device sends the first target penalty result to the first traffic accident handling device, the penalty device may also send the first target penalty result to the second traffic accident handling device.

At block 315, the first traffic accident handling device stores the first target penalty result into the blockchain.

It should be noted that the operation of the block 303 may be executed simultaneously with the block 312 or the block 315. Alternatively, the operation of the block 303 may be executed after the block 312 or the block 315. The specific execution sequence may be determined according to the actual situation, and is not specifically limited here. The operation of the block 305 may be executed when a traffic accident occurs. Alternatively, if no traffic accident data interaction between the first traffic accident handling device and the second traffic accident handling device is needed, the operation of the block 305 may be executed before the block 308. In other words, the communication connection between the first traffic accident handling device and the second traffic accident handling device is established when interaction of the first penalty result with the second penalty result is needed, thereby reducing energy consumption of the first traffic accident handling device and the second traffic accident handling device (e.g. consumption of electric energy), and even saving mobile data traffic of the first traffic accident handling device and the second traffic accident handling device when the communication mode between the first traffic accident handling device and the second traffic accident handling device is the mobile communication network.

In an example, the operation of the block 305 may be executed before the block 308. The rear camera that is arranged in the first vehicle and has communication connection with the first traffic accident handling device photographs and extracts the license plate number of the second vehicle. It is determined according to the license plate number of the second vehicle that the first vehicle may communicate with the second vehicle through a Bluetooth communication mode. The first vehicle obtains the GPS positioning information of the first vehicle at the time of collision between the first vehicle and the second vehicle, and takes the license plate number of the first vehicle and the GPS positioning information of the first vehicle as a Bluetooth pairing code. The first traffic accident handling device sends a matching signal to the second vehicle based on the Bluetooth pairing code, so as to establish the communication with the second traffic accident handling device of the second vehicle. As such, the first traffic accident handling device executes the operation of the block 305. Alternatively, the second traffic accident handling device may take the license plate number of the second vehicle and the GPS positioning information of the second vehicle as a Bluetooth pairing code and send a matching signal to the front vehicle, so that the second traffic accident handling device may implement the operation of the block 305. Then, the first traffic accident handling device executes the operation of the block 308. The first penalty result that the first vehicle is not responsible and the second vehicle is rear-ending is sent to the second traffic accident handling device through the Bluetooth communication mode. The second traffic accident handling device executes the operation of the block 310. The second penalty result that the second vehicle rear-ends the first vehicle is sent to the first traffic accident handling device through the Bluetooth communication mode.

Figure 5:
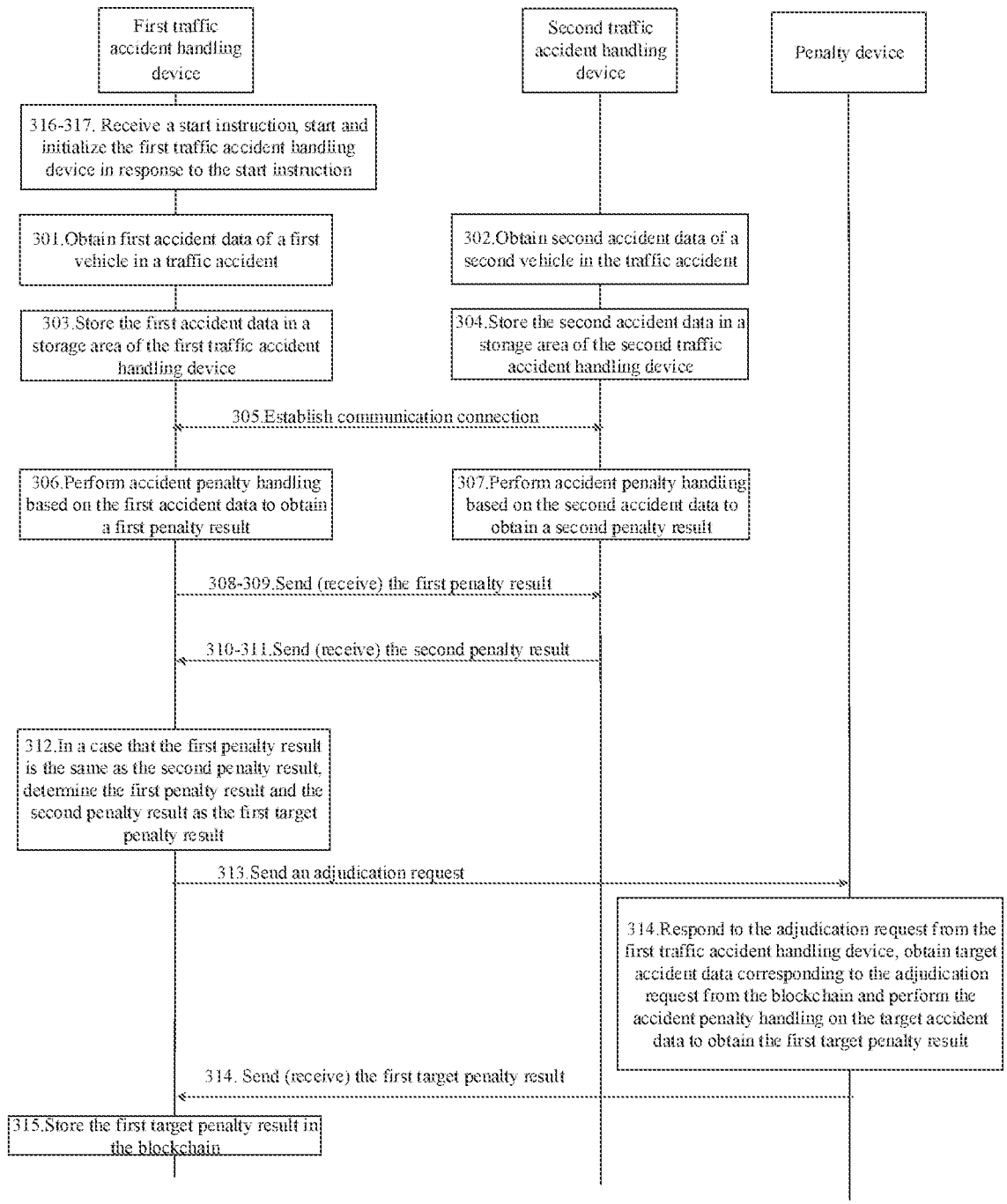
FIG. 5 is a flowchart of a method for traffic accident handling according to another embodiment of the present disclosure.

Based on the embodiments illustrated in FIG. 4, before the operation of the block 301 is executed by the first traffic accident handling device or the second traffic accident handling device, the first traffic accident handling device and the second traffic accident handling device may further execute operations of the block 316 and 317, which is illustrated in FIG. 5.

At block 316, the first traffic accident handling device receives a start instruction.

In the embodiments of the present disclosure, the start instruction received by the first traffic accident handling device may be generated during the startup of the first vehicle. The startup of the first vehicle may refer to startup of engine of the first vehicle, and the startup of the second vehicle is the same. Alternatively, the first traffic accident handling device receiving the start instruction may be realized by operation on startup button of the first traffic accident handling device by user in the first vehicle.

At block 317, the first traffic accident handling device is started and initialized in response to the start instruction.

In the embodiments of the present disclosure, initialization of the first traffic accident handling device may refer to initialization of the smart contract or the like running in the first traffic accident handling device, and initialization of the second traffic accident handling device is the same.

In other embodiments of the present disclosure, the operation of starting and initializing the first traffic accident handling device in response to the start instruction in the block 317 may be realized by operations d11 to d15.

In the operation d11, the first traffic accident handling device starts itself in response to the start instruction.

In the operation d12, the first traffic accident handling device establishes communication connection with the acquisition device.

Herein the acquisition device is configured to collect the first accident data.

In the embodiments of the present disclosure, the acquisition device may include at least one of a positioning device, a ranging device, a camera and/or photographing device, an acceleration sensor device, a voice acquisition device and a driving direction acquisition device. Herein the positioning device may be a GPS positioning module or the like; the ranging device may be a radar rangefinder or the like; the acceleration sensor device may be an acceleration sensor or the like; the voice acquisition device may be a microphone or the like, and the driving direction acquisition device may be a gyroscope or the like.

In the operation d13, the first traffic accident handling device establishes communication connection with the blockchain network corresponding to blockchain based on first node identification information of the first node.

In the operation d14, the first traffic accident handling device obtains a node certificate corresponding to the first node identification information and installs the node certificate.

Herein the node certificate is configured to indicate identity information of the first vehicle in the blockchain.

In the operation d15, the first traffic accident handling device obtains the smart contract, installs and runs the smart contract.

In some application scenarios, the operations d11 to d15 may be implemented when the first traffic accident handling device is used for the first time after leaving the factory.

Figure 6:
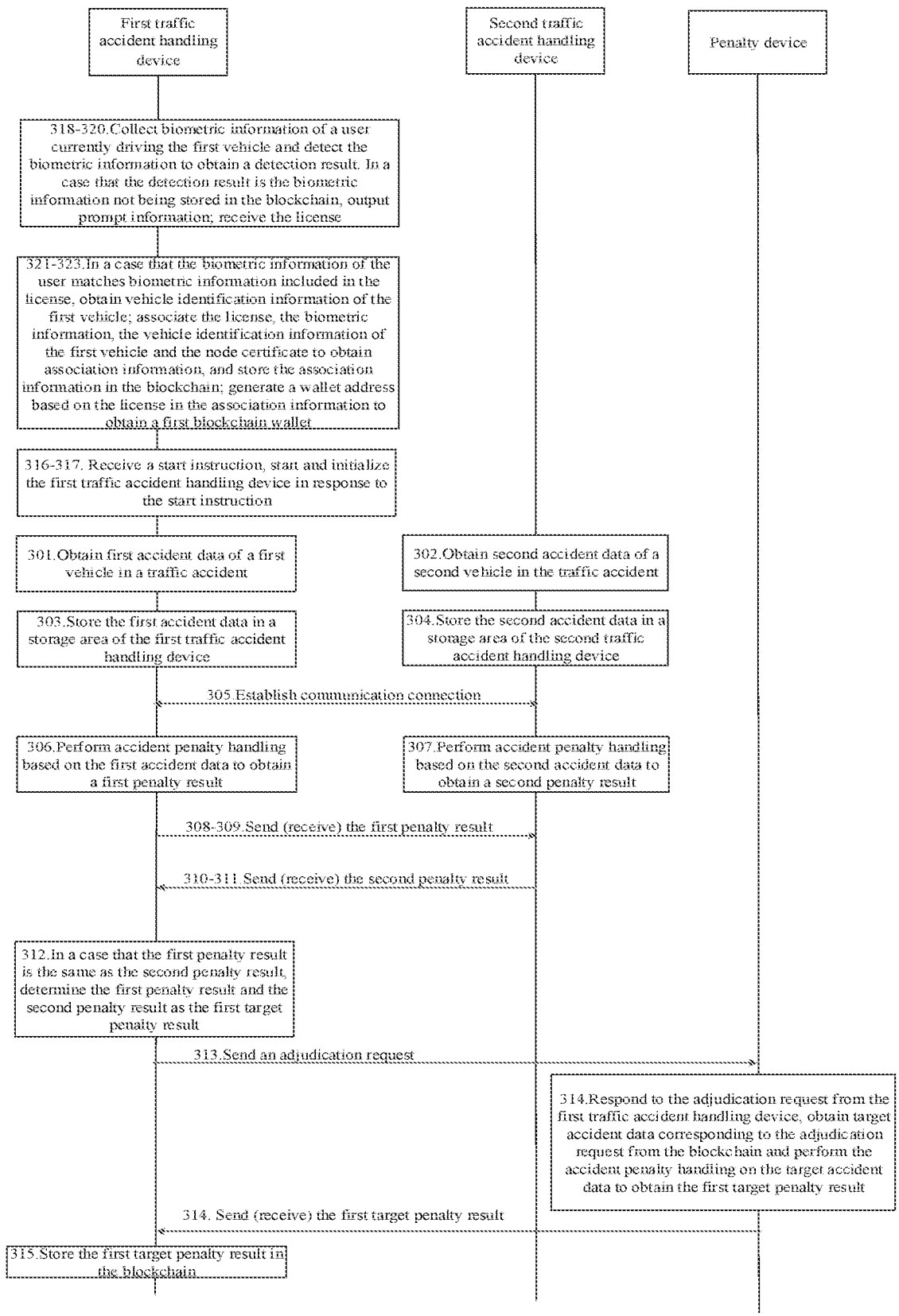
FIG. 6 is flowchart of another method for traffic accident handling according to another embodiment of the present disclosure.

Based on the embodiments illustrated in FIG. 5, after the operation of the block 317 is executed by the first traffic accident handling device or the second traffic accident handling device, the following operations may be executed, which is illustrated in FIG. 6.

At block 318, the first traffic accident handling device collects biometric information of a user currently driving the first vehicle and detects the biometric information to obtain a detection result.

In the embodiments of the present disclosure, the biometric information of the user may include facial feature information of the user (e.g. facial photo of the user), d or may include iris information of eyes, fingerprint information, even skin texture information of the user, etc.

In an example, a photo of a driver on a driving seat of the first vehicle including facial feature information is collected through a camera that is installed in the first vehicle and has communication connection with the first traffic accident handling device. Comparison is performed based on the collected photo including facial feature information and reference images stored in the blockchain to determine whether the driver has registered in the blockchain, thereby obtaining the detection result.

At block 319, in a case that the detection result is the biometric information not being stored in the blockchain, traffic accident handling device outputs prompt information.

Herein the prompt information is configured to prompt the user to input a license.

In the embodiments of the present disclosure, if the detection result is that the biometric information is stored in the blockchain, since information related to the user and the blockchain wallet already exist in the blockchain, there is no need to perform the registration operation and the like. If the detection result is that the biometric information is not stored in the blockchain, the first traffic accident handling device outputs the prompt information. The prompt information may be output by voice information. Alternatively, the prompt information may be output by text and displayed on a display screen of the first traffic accident handling device. Alternatively, the text prompt information may be output and displayed on a display device that has communication connection with the first traffic accident handling device and is able to display information, such as a mobile phone. Alternatively, the voice information and text prompt information may be output at the same time.

License generally refers to a driving license issued to the driver by the relevant department, which includes a motor vehicle driving license or a non-motor vehicle driving license. In some application scenarios, the license may include vehicle license in addition to the driving license.

At block 320, the first traffic accident handling device receives the license.

In the embodiments of the present disclosure, the first traffic accident handling device receives the license uploaded by the user.

At block 321, in a case that the biometric information of the user matches biometric information included in the license, the first traffic accident handling device obtains vehicle identification information of the first vehicle.

At block 322, the license, the biometric information, the vehicle identification information of the first vehicle and the node certificate are associated to obtain association information, and the association information is stored in the blockchain.

Herein the association information is configured to indicate that the user is allowed to drive the first vehicle.

In the embodiments of the present disclosure, the first traffic accident handling device performs face matching processing on the collected photo including the facial feature information of the user and a photo of the user on the driving license. If the collected photo including the facial feature information of the user matches the photo of the user on the driving license, the first traffic accident handling device binds the vehicle identification information of the first vehicle, the driving license, the collected photo including the facial feature information of the user and the node certificate corresponding to the first traffic accident handling device, and stores the binding information in the blockchain, so that the next time the user drives the first vehicle, there is no need to input the information such as the driving license again, thereby saving the authentication operation process when driving the first vehicle.

At block 323, the first traffic accident handling device generates a first wallet address based on the license in the association information to obtain a first blockchain wallet.

Herein the first blockchain wallet is configured to store a penalty in the first target penalty result corresponding to the license certificate.

In the embodiments of the present disclosure, the first blockchain wallet stores currency corresponding to the user driving the vehicle. In some application scenarios, the first blockchain wallet may further store record of points deduction for violation of the user.

It should be noted that the operations of the blocks 318 to 323 are mainly for the first vehicle to be driven by a user. If a driverless vehicle has a mode that requires the user to drive the vehicle, the operations of the blocks 318 to 323 should also be performed. Whether the operations of the blocks 318 to 323 needs to be performed when the driverless vehicle is in the driverless mode may be determined according to the actual traffic rules. The implementation process for the second vehicle is the same as the process illustrated in the blocks 318 to 323, which will not be described in detail here.

Figure 7:
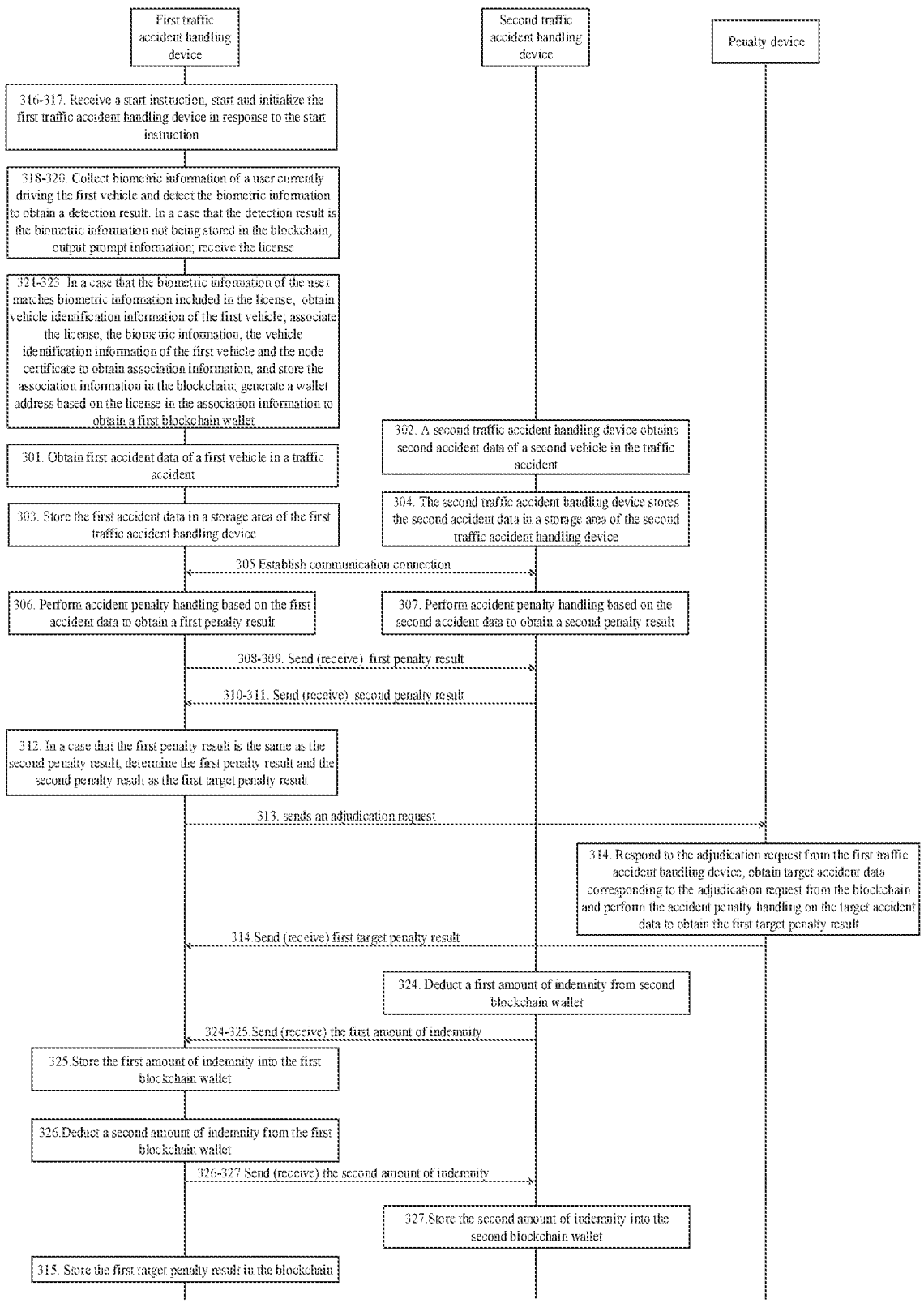
FIG. 7 is a flowchart of yet another method for traffic accident handling according to another embodiment of the present disclosure.

Based on the embodiments illustrated in FIG. 6, after the operation of the block 312 or 314 is performed, the first traffic accident handling device may also perform operations of blocks 324 to 325 or operations of blocks 326 to 327, which is illustrated in FIG. 7.

At block 324, the second traffic accident handling device deducts a first amount of indemnity from second blockchain wallet and sends the first amount of indemnity to the first traffic accident handling device.

At block 325, the first traffic accident handling device receives the first amount of indemnity from the second traffic accident handling device and stores the first amount of indemnity into the first blockchain wallet.

Herein the first target penalty result includes the first amount of indemnity, and the second target penalty result includes the first amount of indemnity.

In the embodiments of the present disclosure, an amount of indemnity to be paid by a responsible party may further be included in the first target penalty result or the second target penalty result. If the first target penalty result or the second target penalty result is that the second vehicle is responsible and the first vehicle is not responsible, the second traffic accident handling device deducts the first amount of indemnity included in the second target penalty result from the second blockchain wallet associated with the license corresponding to the user that currently drives the second vehicle, and sends the first amount of indemnity to the first traffic accident handling device. After receiving the first amount of indemnity, the first traffic accident handling device stores the first amount of indemnity into the first blockchain wallet associated with the license corresponding to the user that currently drives the first vehicle.

In other embodiments of the present disclosure, after the operation of the block 325 is performed, the second traffic accident handling device may further performs the following operation. In a case that the second target penalty result is that the second vehicle is the party responsible for the accident and has a traffic violation, a target number of driving credits is deducted from the second blockchain wallet.

Herein the target number of driving credits is included in the second target penalty result.

In the embodiments of the present disclosure, the driving credits may be a current score set for the driver. In case of violation, the score will be deducted. It can be determined according to the traffic rules which regulations are currently violated, so as to determine the target number of driving credits.

At block 326, the first traffic accident handling device deducts a second amount of indemnity from the first blockchain wallet and sends the second amount of indemnity to the second traffic accident handling device.

At block 327, the second traffic accident handling device receives the second amount of indemnity from the first traffic accident handling device and stores the second amount of indemnity into the second blockchain wallet.

Herein the first target penalty result includes the second amount of indemnity, and the second target penalty result includes the second amount of indemnity.

In other embodiments of the present disclosure, after the operation of the block 327 is performed, the first traffic accident handling device may further perform the following operation. In a case that the first target penalty result is that the first vehicle is the party responsible for the accident and has the traffic violation, a target number of driving credits is deducted from the first blockchain wallet.

Herein the target number of driving credits is included in the first target penalty result.

It should be noted that the operations of the first traffic accident handling device and the second traffic accident handling device may be the same, and are interchangeable.

It should be noted that the same operations and contents in the embodiments as in other embodiments may be described with reference to other embodiments and will not be repeated here.

According to the method for traffic accident handling provided in the embodiments of the present disclosure, the first accident data of the first vehicle in the traffic accident is obtained. The accident penalty handling is performed based on the first accident data to obtain the first penalty result. The second penalty result is received from the second traffic accident handling device. The first target penalty result is determined based on the first penalty result and the second penalty result. In this way, the involved parties in the traffic accident run the same smart contract, which can ensure the consistency of the accident penalty handling. Furthermore, the involved parties, which are nodes in the blockchain network, can directly realize the point-to-point communication to perform interaction on the corresponding penalty results, thereby simplifying the communication process between the nodes in the blockchain network, solving the problem that efficiency of traffic accident handling is low due to the tedious and the time-consuming process of the traffic accident handling when traffic accidents occur, ensuring the credibility of accident penalty handling based on the blockchain and effectively improving the efficiency of traffic accident handling.

Figure 8:
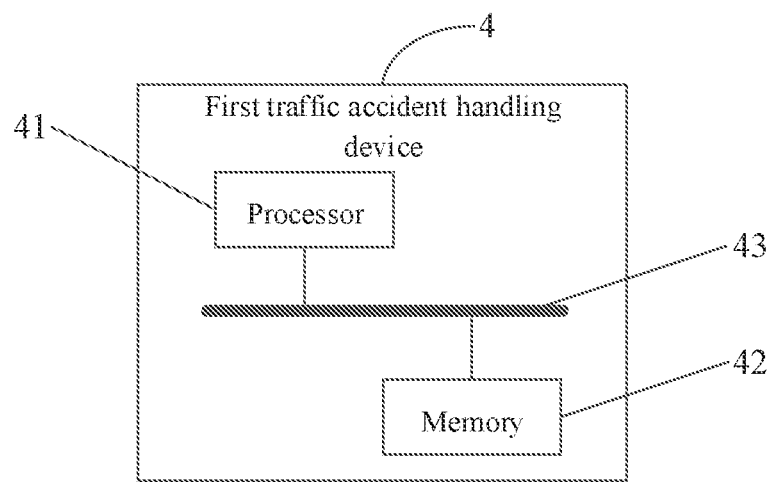
FIG. 8 is a structural diagram of a first traffic accident handling device according to an embodiment of the present disclosure.

Based on the above mentioned embodiments, embodiments of the present disclosure provide a first traffic accident handling device, which may be applied to the methods for traffic accident handling provided in the embodiments corresponding to FIG. 1 to FIG. 7. The first traffic accident handling device corresponds to a first node in a blockchain. As illustrated in FIG. 8, the first traffic accident handling device 4 includes a processor 41, a memory 42 and a communication bus 43.

The communication bus 43 is configured to realize communication connection between the processor 41 and the memory 42.

The processor 41 is configured to run a smart contract stored in the memory and execute a traffic accident handling program stored in the memory through the smart contract, so as to implement the following operations:

First accident data of a first vehicle in a traffic accident is obtained. Herein the first traffic accident handling device has an association relationship with the first vehicle.

Accident penalty handling is performed based on the first accident data to obtain a first penalty result.

A second penalty result is received from a second traffic accident handling device. Herein the second traffic accident handling device has an association relationship with a second vehicle other than the first vehicle in the traffic accident. The second traffic accident handling device corresponds to a second node in the blockchain network and is configured to run the smart contract. The second penalty result is obtained by the second traffic accident handling device performing the accident penalty handling on the traffic accident through the smart contract.

A first target penalty result is determined based on the first penalty result and the second penalty result.

In other embodiments of the present disclosure, after the first accident data of the first vehicle in the traffic accident is obtained, the processor is further configured to perform the following operation.

The first accident data is stored in a storage area of the first traffic accident handling device.

In other embodiments of the present disclosure, the first target penalty result is determined based on the first penalty result and the second penalty result, which may be realized by the processor through the following operation.

In a case that the first penalty result is the same as the second penalty result, the first penalty result and the second penalty result are determined as the first target penalty result.

In other embodiments of the present disclosure, the first target penalty result is determined based on the first penalty result and the second penalty result, which may also be realized by the processor through the following operation.

In a case that the first penalty result is different from the second penalty result, an adjudication request is sent to a penalty device. Herein the adjudication request is configured to request the penalty device to perform the accident penalty handling based on the first accident data in the blockchain to obtain the first target penalty result.

The first target penalty result is received from the penalty device.

In other embodiments of the present disclosure, after the first target penalty result is determined based on the first penalty result and the second penalty result, the processor is further configured to perform the following operation.

The first target penalty result is stored in the blockchain.

In other embodiments of the present disclosure, before the second penalty result from the second traffic accident handling device is received, the processor is further configured to perform the following operation.

Communication connection with the second traffic accident handling device is established.

In other embodiments of the present disclosure, the accident penalty handling is performed based on the first accident data to obtain the first penalty result, which may be realized by the processor through the following operations.

Second accident data of the second vehicle is obtained.

The accident penalty handling is performing based on the first accident data and the second accident data to obtain the first penalty result.

In other embodiments of the present disclosure, the second accident data of the second vehicle is obtained, which may be realized by the processor through the following operations.

The second accident data is obtained from the blockchain.

Alternatively, a request is sent to the second traffic accident handling device. Herein the request is configured to request the second traffic accident handling device to send the second accident data to the first traffic accident handling device.

The second accident data is received from the second traffic accident handling device.

In other embodiments of the present disclosure, the communication connection with the second traffic accident handling device is established, which may be realized by the processor through the following operations.

Vehicle identification information of the second vehicle is obtained.

A communication mode corresponding to the vehicle identification information of the second vehicle is determined.

The communication connection with the second traffic accident handling device is established based on the communication mode.

In other embodiments of the present disclosure, the communication mode stored in the memory includes an instant chat tool mode for communication based on a preset communication network, or a wireless short-range instant communication mode.

In other embodiments of the present disclosure, the communication connection with the second traffic accident handling device is established based on the communication mode, which may be realized by the processor through the following operations.

In a case that a target distance between the first vehicle and the second vehicle is within a preset distance range, the wireless short-range instant communication mode is enabled, and the communication connection with the second traffic accident handling device is established through the wireless short-range instant communication mode. Herein the first accident data includes the target distance.

In other embodiments of the present disclosure, before the first accident data of the target vehicle in the traffic accident is obtained, the processor is further configured to perform the following operations.

A start instruction is received.

The first traffic accident handling device is started and the first traffic accident handling device is initialized in response to the start instruction.

In other embodiments of the present disclosure, the first traffic accident handling device is started and the first traffic accident handling device is initialized in response to the start instruction, which may be realized by the processor through the following operations.

The first traffic accident handling device is started in response to the start instruction.

Communication connection with an acquisition device is established. Herein the acquisition device is configured to collect the first accident data.

Communication connection with the blockchain network corresponding to blockchain is established based on first node identification information of the first node.

A node certificate corresponding to the first node identification information is obtained and the node certificate is installed. Herein the node certificate is configured to indicate identity information of the first vehicle in the blockchain.

The smart contract is obtained. The smart contract is installed and run.

In other embodiments of the present disclosure, after the first traffic accident handling device is started and the first traffic accident handling device is initialized in response to the start instruction, the processor is further configured to perform the following operations.

Biometric information of a user currently driving the first vehicle is collected, and the biometric information is detected to obtain a detection result.

In a case that the detection result is the biometric information not being stored in the blockchain, prompt information is output. Herein the prompt information is configured to prompt the user to input a license.

The license is received.

In a case that the biometric information of the user matches biometric information included in the license, vehicle identification information of the first vehicle is obtained.

The license, the biometric information of the user, the vehicle identification information of the first vehicle and the node certificate are associated to obtain association information, and the association information is stored in the blockchain. Herein the association information is configured to indicate that the user is allowed to drive the first vehicle.

A first wallet address is generated based on the license in the association information to obtain a first blockchain wallet. Herein the first blockchain wallet is configured to store a penalty in the first target penalty result corresponding to the license certificate.

In other embodiments of the present disclosure, after first target penalty result is determined based on the first penalty result and the second penalty result, the processor is further configured to perform the following operations.

A first amount of indemnity is received from the second traffic accident handling device, and the first amount of indemnity is stored into the first blockchain wallet. Herein the first target penalty result includes the first amount of indemnity.

Alternatively, a second amount of indemnity is deducted from the first blockchain wallet, and the second amount of indemnity is sent to the second traffic accident handling device. Herein the first target penalty result includes the second amount of indemnity In other embodiments of the present disclosure, after the first target penalty result is determined based on the first penalty result and the second penalty result, the processor is further configured to perform the following operations.

In a case that the first target penalty result is that the first vehicle is a party responsible for the accident and has a traffic violation, a target number of driving credits is deducted from the first blockchain wallet. Herein the target number of driving credits is included in the first target penalty result.

It should be noted that the specific implementation process of the operations performed by the processor in the embodiments of the present disclosure may refer to the implementation process of the methods for traffic accident handling provided in the embodiments corresponding to FIG. 1 to FIG. 7, and will not be described here.

According to the first traffic accident handling device provide in the embodiments of the present disclosure, the involved parties in the traffic accident all run the same smart contract, which can ensure the consistency of the accident penalty handling. Furthermore, the involved parties, which are nodes in the blockchain network, can directly realize the point-to-point communication to exchange the corresponding penalty results, thereby simplifying the communication process between the nodes in the blockchain network, solving the problem that efficiency of traffic accident handling is low due to the tedious and the time-consuming process of the traffic accident handling when traffic accidents occur, ensuring the credibility of accident penalty handling based on the blockchain and effectively improving the efficiency of traffic accident handling.

Based on the above mentioned embodiments, embodiments of the present disclosure provide a storage medium. The storage medium has one or more programs stored thereon. The one or more programs may be executed by one or more processors to implement the following operations.

First accident data of a first vehicle in a traffic accident is obtained. Herein the first traffic accident handling device has an association relationship with the first vehicle.

Accident penalty handling is performed based on the first accident data to obtain a first penalty result.

A second penalty result is received from a second traffic accident handling device. Herein the second traffic accident handling device has an association relationship with a second vehicle other than the first vehicle in the traffic accident. The second traffic accident handling device corresponds to a second node in the blockchain network and is configured to run the smart contract. The second penalty result is obtained by the second traffic accident handling device performing the accident penalty handling on the traffic accident through the smart contract.

A first target penalty result is determined based on the first penalty result and the second penalty result.

In other embodiments of the present disclosure, after the first accident data of the first vehicle in the traffic accident is obtained, the processor is further configured to perform the following operation.

The first accident data is stored in a storage area of the first traffic accident handling device.

In other embodiments of the present disclosure, the first target penalty result is determined based on the first penalty result and the second penalty result, which may be realized by the processor through the following operation.

In a case that the first penalty result is the same as the second penalty result, the first penalty result and the second penalty result are determined as the first target penalty result.

In other embodiments of the present disclosure, the processor is further configured to perform the following operations.

In a case that the first penalty result is different from the second penalty result, an adjudication request is sent to a penalty device. Herein the adjudication request is configured to request the penalty device to perform the accident penalty handling based on the first accident data in the blockchain to obtain the first target penalty result.

The first target penalty result is received from the penalty device.

In other embodiments of the present disclosure, after the first target penalty result is determined based on the first penalty result and the second penalty result, the processor is further configured to perform the following operation.

The first target penalty result is stored in the blockchain.

In other embodiments of the present disclosure, before the second penalty result is received from the second traffic accident handling device, the processor is further configured to perform the following operation.

Communication connection with the second traffic accident handling device is established.

In other embodiments of the present disclosure, the accident penalty handling is performed based on the first accident data to obtain the first penalty result, which may be realized by the processor through the following operations.

Second accident data of the second vehicle is obtained.

The accident penalty handling is performed based on the first accident data and the second accident data to obtain the first penalty result.

In other embodiments of the present disclosure, the second accident data of the second vehicle is obtained, which may be realized by the processor through the following operations.

The second accident data is obtained from the blockchain.

Alternatively, a request is sent to the second traffic accident handling device. Herein the request is configured to request the second traffic accident handling device to send the second accident data to the first traffic accident handling device.

The second accident data is received from the second traffic accident handling device.

In other embodiments of the present disclosure, the communication connection with the second traffic accident handling device is established, which may be realized by the processor through the following operations.

Vehicle identification information of the second vehicle is obtained.

A communication mode corresponding to the vehicle identification information of the second vehicle is determined.

The communication connection with the second traffic accident handling device is established based on the communication mode.

In other embodiments of the present disclosure, the communication mode includes an instant chat tool mode for communication based on a preset communication network, or a wireless short-range instant communication mode.

In other embodiments of the present disclosure, the communication connection with the second traffic accident handling device is established based on the communication mode, which may be realized by the processor through the following operations.

In a case that a target distance between the first vehicle and the second vehicle is within a preset distance range, the wireless short-range instant communication mode is enabled, and the communication connection with the second traffic accident handling device is established through the wireless short-range instant communication mode. Herein the first accident data includes the target distance.

In other embodiments of the present disclosure, before the first accident data of the target vehicle in the traffic accident is obtained, the processor is further configured to perform the following operations.

A start instruction is received.

The first traffic accident handling device is started and the first traffic accident handling device is initialized in response to the start instruction.

In other embodiments of the present disclosure, the first traffic accident handling device is started and the first traffic accident handling device is initialized in response to the start instruction, which may be realized by the processor through the following operations.

The first traffic accident handling device is started in response to the start instruction.

Communication connection with an acquisition device is established. Herein the acquisition device is configured to collect the first accident data.

Communication connection with the blockchain network corresponding to blockchain is established based on first node identification information of the first node.

A node certificate corresponding to the first node identification information is obtained and the node certificate is installed. Herein the node certificate is configured to indicate identity information of the first vehicle in the blockchain.

The smart contract is obtained. The smart contract is installed and run.

In other embodiments of the present disclosure, after the first traffic accident handling device is started and the first traffic accident handling device is initialized in response to the start instruction, the processor is further configured to perform the following operations.

Biometric information of a user currently driving the first vehicle is collected, and the biometric information is detected to obtain a detection result.

In a case that the detection result is the biometric information not being stored in the blockchain, prompt information is output. Herein the prompt information is configured to prompt the user to input a license.

The license is received.

In a case that the biometric information of the user matches biometric information included in the license, vehicle identification information of the first vehicle is obtained.

The license, the biometric information of the user, the vehicle identification information of the first vehicle and the node certificate are associated to obtain association information, and the association information is stored in the blockchain. Herein the association information is configured to indicate that the user is allowed to drive the first vehicle.

A first wallet address is generated based on the license in the association information to obtain a first blockchain wallet. Herein the first blockchain wallet is configured to store a penalty in the first target penalty result corresponding to the license certificate.

In other embodiments of the present disclosure, after first target penalty result is determined based on the first penalty result and the second penalty result, the processor is further configured to perform the following operations.

A first amount of indemnity is received from the second traffic accident handling device, and the first amount of indemnity is stored into the first blockchain wallet. Herein the first target penalty result includes the first amount of indemnity.

Alternatively, a second amount of indemnity is deducted from the first blockchain wallet, and the second amount of indemnity is sent to the second traffic accident handling device. Herein the first target penalty result includes the second amount of indemnity In other embodiments of the present disclosure, after the first target penalty result is determined based on the first penalty result and the second penalty result, the processor is further configured to perform the following operations.

In a case that the first target penalty result is that the first vehicle is a party responsible for the accident and has a traffic violation, a target number of driving credits is deducted from the first blockchain wallet. Herein the target number of driving credits is included in the first target penalty result.

It should be noted that the specific implementation process of the operations performed by the processor in the embodiments of the present disclosure may refer to the implementation process of the methods for traffic accident handling provided in the embodiments corresponding to FIG. 1 to FIG. 7, and will not be described here.

The above are merely embodiments of the present disclosure and are not intended to limit the scope of protection of the present disclosure. Any modification, equivalent replacement and improvement made within the spirit and scope of the present disclosure are within the scope of protection of the present disclosure.

INDUSTRIAL APPLICABILITY

Embodiments of the present disclosure provide a method and device for traffic accident handling and a storage medium. The method is applied to a smart contract running in a first traffic accident handling device corresponding to a first node in a blockchain network. The method includes the following operations. First, accident data of a first vehicle in a traffic accident is obtained. Herein the first traffic accident handling device has an association relationship with the first vehicle. Accident penalty handling is performed based on the first accident data to obtain a first penalty result. A second penalty result is received from a second traffic accident handling device. Herein the second traffic accident handling device has an association relationship with a second vehicle other than the first vehicle in the traffic accident. The second traffic accident handling device corresponds to a second node in the blockchain network and is configured to run the smart contract. The second penalty result is obtained by the second traffic accident handling device performing the accident penalty handling on the traffic accident through the smart contract. A first target penalty result is determined based on the first penalty result and the second penalty result, thereby simplifying the communication process between the nodes in the blockchain network, ensuring the credibility of accident penalty handling based on the blockchain and effectively improving the efficiency of traffic accident handling.

The invention claimed is:

1. A method for traffic accident handling, performed by a first traffic accident handling device configured to run a smart contract, the first traffic accident handling device being a first node in a blockchain network, the method comprising:

obtaining first accident data of a first vehicle in a traffic accident, wherein the first traffic accident handling device has an association relationship with the first vehicle;

performing, based on the first accident data, accident penalty handling to obtain a first penalty result;

receiving a second penalty result from a second traffic accident handling device, wherein the second traffic accident handling device has an association relationship with a second vehicle other than the first vehicle in the traffic accident; the second traffic accident handling device corresponds to a second node in the blockchain network and is configured to run the smart contract, and the second penalty result is obtained by the second traffic accident handling device performing the accident penalty handling on the traffic accident through the smart contract; and determining, based on the first penalty result and the second penalty result, a first target penalty result, wherein the first accident data is obtained through acquisition at a site of the traffic accident by at least one acquisition device having communication connection with the first traffic accident handling device when the traffic accident occurs on the first vehicle, wherein the first accident data comprises at least one of sound information of vehicle collision when the traffic accident occurs, image information of a collision position where the first vehicle collides with the second vehicle, video information including a process of the vehicle collision, distance information between the first vehicle and the second vehicle when the vehicle collision occurs, or information of a position where the traffic accident occurs, wherein before obtaining the first accident data of the first vehicle in the traffic accident, the method further comprises:

receiving a start instruction; and in response to the start instruction, starting the first traffic accident handling device and initializing the first traffic accident handling device, wherein in response to the start instruction, starting the first traffic accident handling device and initializing the first traffic accident handling device comprises:

in response to the start instruction, starting the first traffic accident handling device;

establishing communication connection with an acquisition device, wherein the acquisition device is configured to collect the first accident data;

establishing communication connection with the blockchain network based on first node identification information of the first node;

obtaining a node certificate corresponding to the first node identification information and installing the node certificate, wherein the node certificate is configured to indicate identity information of the first vehicle in the blockchain; and obtaining the smart contract, and installing and running the smart contract, wherein after starting the first traffic accident handling device and initializing the first traffic accident handling device in response to the start instruction, the method further comprises:

collecting biometric information of a user currently driving the first vehicle and detecting the biometric information to obtain a detection result;

in a case that the detection result is the biometric information not being stored in the blockchain, outputting prompt information, wherein the prompt information is configured to prompt the user to input a license;

receiving the license;

in a case that the biometric information of the user matches biometric information included in the license, obtaining vehicle identification information of the first vehicle;

associating the license, the biometric information of the user, the vehicle identification information of the first vehicle and the node certificate to obtain association information, and storing the association information in the blockchain, wherein the association information is configured to indicate that the user is allowed to drive the first vehicle; and generating a first wallet address based on the license in the association information to obtain a first blockchain wallet, wherein the first blockchain wallet is configured to store a penalty in the first target penalty result corresponding to the license.

2. The method of claim 1, wherein after obtaining the first accident data of the first vehicle in the traffic accident, the method further comprises:

storing the first accident data in a storage area of the first traffic accident handling device.

3. The method of claim 2, wherein determining, based on the first penalty result and the second penalty result, the first target penalty result comprises:

in a case that the first penalty result is the same as the second penalty result, determining the first penalty result and the second penalty result as the first target penalty result.

4. The method of claim 2, further comprising:

in a case that the first penalty result is different from the second penalty result, sending an adjudication request to a penalty device, wherein the adjudication request is configured to request the penalty device to perform the accident penalty handling based on the first accident data in the blockchain to obtain the first target penalty result; and receiving the first target penalty result from the penalty device.

5. The method of claim 1, wherein after determining, based on the first penalty re sult and the second penalty result, the first target penalty result, the method comprises:

storing the first target penalty result in the blockchain.

6. The method of claim 1, wherein before receiving the second penalty result from the second traffic accident handling device, the method further comprises:

establishing communication connection with the second traffic accident handling device.

7. The method of claim 6, wherein performing, based on the first accident data, the accident penalty handling to obtain the first penalty result comprises:

obtaining second accident data of the second vehicle; and performing, based on the first accident data and the second accident data, the accident penalty handling to obtain the first penalty result.

8. The method of claim 7, wherein obtaining the second accident data of the second vehicle comprises:

obtaining the second accident data from the blockchain; or sending a request to the second traffic accident handling device, wherein the request is configured to request the second traffic accident handling device to send the second accident data to the first traffic accident handling device; and receiving the second accident data from the second traffic accident handling device.

9. The method of claim 6, wherein establishing the communication connection with the second traffic accident handling device comprises:
obtaining vehicle identification information of the second vehicle;
determining a communication mode corresponding to the vehicle identification information of the second vehicle; and
establishing the communication connection with the second traffic accident handling device based on the communication mode.

10. The method of claim 9, wherein the communication mode comprises an instant chat tool mode for communication based on a preset communication network, or a wireless short-range instant communication mode.

11. The method of claim 10, wherein establishing the communication connection with the second traffic accident handling device based on the communication mode comprises:
in a case that a target distance between the first vehicle and the second vehicle is within a preset distance range, enabling the wireless short-range instant communication mode and establishing the communication connection with the second traffic accident handling device through the wireless short-range instant communication mode, wherein the first accident data comprises the target distance.

12. The method of claim 1, wherein after determining, based on the first penalty result and the second penalty result, the first target penalty result, the method further comprises:
receiving a first amount of indemnity from the second traffic accident handling device, and storing the first amount of indemnity into the first blockchain wallet, wherein the first target penalty result comprises the first amount of indemnity; or
deducting a second amount of indemnity from the first blockchain wallet and sending the second amount of indemnity to the second traffic accident handling device, wherein the first target penalty result comprises the second amount of indemnity.

13. The method of claim 1, wherein after determining, based on the first penalty result and the second penalty result, the first target penalty result, the method further comprises:
in a case that the first target penalty result is that the first vehicle is a party responsible for the accident and has a traffic violation, deducting a target number of driving credits from the first blockchain wallet, wherein the target number of driving credits is included in the first target penalty result.

14. A first traffic accident handling device, the first traffic accident handling device being a first node in a blockchain and comprising a processor, a memory and a communication bus,
wherein the communication bus is configured to realize communication connection between the processor and the memory, and
the processor is configured to run a smart contract stored in the memory and execute a traffic accident handling program stored in the memory through the smart contract so as to:
obtain first accident data of a first vehicle in a traffic accident, wherein the first traffic accident handling device has an association relationship with the first vehicle;
perform, based on the first accident data, accident penalty handling to obtain a first penalty result;
receive a second penalty result from a second traffic accident handling device, wherein the second traffic accident handling device has an association relationship with a second vehicle other than the first vehicle in the traffic accident; the second traffic accident handling device corresponds to a second node in the blockchain and is configured to run the smart contract, and the second penalty result is obtained by the second traffic accident handling device performing the accident penalty handling on the traffic accident through the smart contract; and
determine, based on the first penalty result and the second penalty result, a first target penalty result,
wherein the first accident data is obtained through acquisition at a site of the traffic accident by at least one acquisition device having communication connection with the first traffic accident handling device when the traffic accident occurs on the first vehicle,
wherein the first accident data comprises at least one of sound information of vehicle collision when the traffic accident occurs, image information of a collision position where the first vehicle collides with the second vehicle, video information including a process of the vehicle collision, distance information between the first vehicle and the second vehicle when the vehicle collision occurs, or information of a position where the traffic accident occurs,
wherein the processor is further configured to:
receive a start instruction; and
in response to the start instruction, start the first traffic accident handling device and initialize the first traffic accident handling device,
wherein the processor is further configured to:
in response to the start instruction, start the first traffic accident handling device;
establish communication connection with an acquisition device, wherein the acquisition device is configured to collect the first accident data;
establish communication connection with the blockchain network based on first node identification information of the first node;
obtain a node certificate corresponding to the first node identification information and install the node certificate, wherein the node certificate is configured to indicate identity information of the first vehicle in the blockchain; and
obtain the smart contract, and install and run the smart contract,
wherein the processor is further configured to:
collect biometric information of a user currently driving the first vehicle and detect the biometric information to obtain a detection result;
in a case that the detection result is the biometric information not being stored in the blockchain, output prompt information, wherein the prompt information is configured to prompt the user to input a license;

receive the license;

in a case that the biometric information of the user matches biometric information included in the license, obtain vehicle identification information of the first vehicle;

associate the license, the biometric information of the user, the vehicle identification information of the first vehicle and the node certificate to obtain association information, and store the association information in the blockchain, wherein the association information is configured to indicate that the user is allowed to drive the first vehicle; and generate a first wallet address based on the license in the association information to obtain a first blockchain wallet, wherein the first blockchain wallet is configured to store a penalty in the first target penalty result corresponding to the license.

15. A non-transitory computer readable storage medium, having executable instructions stored thereon, wherein the executable instructions, when executed, cause a processor in a first traffic accident handling device corresponding to a first node in a blockchain network to:

obtain first accident data of a first vehicle in a traffic accident, wherein the first traffic accident handling device has an association relationship with the first vehicle;

perform, based on the first accident data, accident penalty handling to obtain a first penalty result;

receive a second penalty result from a second traffic accident handling device, wherein the second traffic accident handling device has an association relationship with a second vehicle other than the first vehicle in the traffic accident; the second traffic accident handling device corresponds to a second node in the blockchain network and is configured to run a smart contract, and the second penalty result is obtained by the second traffic accident handling device performing the accident penalty handling on the traffic accident through the smart contract; and determine, based on the first penalty result and the second penalty result, a first target penalty result, wherein the first accident data is obtained through acquisition at a site of the traffic accident by at least one acquisition device having communication connection with the first traffic accident handling device when the traffic accident occurs on the first vehicle, wherein the first accident data comprises at leastone of sound information of vehicle collision when the traffic accident occurs, image information of a collision position where the first vehicle collides with the second vehicle, video information including a process of the vehicle collision, distance information between the first vehicle and the second vehicle when the vehicle collision occurs, or information of a position where the traffic accident occurs, wherein the executable instructions, when executed, further cause the processor in the first traffic accident handling device corresponding to the first node in the blockchain network to:

receive a start instruction; and in response to the start instruction, start the first traffic accident handling device and initialize the first traffic accident handling device, wherein the executable instructions, when executed, further cause the processor in the first traffic accident handling device corresponding to the first node in the blockchain network to:

in response to the start instruction, start the first traffic accident handling device;

establish communication connection with an acquisition device, wherein the acquisition device is configured to collect the first accident data;

establish communication connection with the blockchain network based on first node identification information of the first node;

obtain a node certificate corresponding to the first node identification information and install the node certificate, wherein the node certificate is configured to indicate identity information of the first vehicle in the blockchain; and obtain the smart contract, and install and run the smart contract, wherein the executable instructions, when executed, further cause the processor in the first traffic accident handling device corresponding to the first node in the blockchain network to:

collect biometric information of a user currently driving the first vehicle and detect the biometric information to obtain a detection result;

in a case that the detection result is the biometric information not being stored in the blockchain, output prompt information, wherein the prompt information is configured to prompt the user to input a license;

receive the license;

in a case that the biometric information of the user matches biometric information included in the license, obtain vehicle identification information of the first vehicle;

associate the license, the biometric information of the user, the vehicle identification information of the first vehicle and the node certificate to obtain association information, and store the association information in the blockchain, wherein the association information is configured to indicate that the user is allowed to drive the first vehicle; and generate a first wallet address based on the license in the association information to obtain a first blockchain wallet, wherein the first blockchain wallet is configured to store a penalty in the first target penalty result corresponding to the license.

16. The non-transitory computer readable storage medium of claim 15, wherein the executable instructions, when executed, further cause the processor to:

store the first accident data in a storage area of the first traffic accident handling device, after obtaining the first accident data of the first vehicle in the traffic accident, the method further.

17. The non-transitory computer readable storage medium of claim 16, wherein the executable instructions, when executed, cause the processor to determine the first penalty result and the second penalty result as the first target penalty result, in a case that the first penalty result is the same as the second penalty result.

* * * * *